United States Patent
Lewis et al.

(10) Patent No.: US 6,955,593 B2
(45) Date of Patent: Oct. 18, 2005

(54) HVAC PROTECTION SYSTEM FOR AUTOMOTIVE VEHICLES

(75) Inventors: Keith Lewis, Macomb Township, MI (US); Rick Scheuer, Harrison Township, MI (US); Conrad Miracle, Capac, MI (US)

(73) Assignee: L & L Products, Inc., Romeo, MI (US)

(*) Notice: Subject to any disclaimer, the term of this patent is extended or adjusted under 35 U.S.C. 154(b) by 1 day.

(21) Appl. No.: 10/819,456

(22) Filed: Apr. 7, 2004

(65) Prior Publication Data

US 2005/0003752 A1 Jan. 6, 2005

Related U.S. Application Data

(60) Provisional application No. 60/475,463, filed on Jun. 3, 2003.

(51) Int. Cl.⁷ .................................................. B60H 1/28
(52) U.S. Cl. ........................................ 454/147; 454/146
(58) Field of Search .............................. 454/146, 147, 454/148, 149

(56) References Cited

U.S. PATENT DOCUMENTS

| | | | |
|---|---|---|---|
| 2,888,274 A | | 5/1959 | Premo |
| 3,062,125 A | | 11/1962 | Henneberger |
| 3,311,043 A | * | 3/1967 | Atkinson ............... 454/275 |
| 3,779,149 A | * | 12/1973 | Bernard, Jr. ............ 454/147 |
| 4,242,951 A | * | 1/1981 | Bemiss ................. 454/146 |
| 4,466,654 A | | 8/1984 | Abe |
| 4,722,265 A | * | 2/1988 | Koukal et al. ........... 454/147 |
| 4,819,550 A | | 4/1989 | Ioka |
| 5,108,146 A | | 4/1992 | Sheppard |
| 5,266,133 A | | 11/1993 | Hanley et al. |
| 5,358,397 A | | 10/1994 | Ligon et al. |
| 5,368,620 A | | 11/1994 | Chiba et al. |
| 5,575,526 A | | 11/1996 | Wycech |
| 5,678,826 A | | 10/1997 | Miller |
| 5,755,486 A | | 5/1998 | Wycech |
| 5,766,719 A | | 6/1998 | Rimkus |
| 5,932,680 A | | 8/1999 | Heider |
| 6,033,300 A | | 3/2000 | Schneider |
| 6,131,897 A | | 10/2000 | Barz et al. |
| 6,185,098 B1 | | 2/2001 | Benavides |
| D448,468 S | | 9/2001 | Koessler |
| 6,422,575 B1 | | 7/2002 | Czaplicki et al. |
| 6,439,991 B1 | | 8/2002 | Jarnot |
| 6,514,136 B1 | * | 2/2003 | Hanaya et al. ........... 454/147 |
| RE38,157 E | | 6/2003 | Schneider |
| 6,692,347 B1 | | 2/2004 | Schneider |

FOREIGN PATENT DOCUMENTS

| | | |
|---|---|---|
| CA | 861234 | 1/1971 |
| WO | WO 00/27920 | 5/2000 |
| WO | WO 03/051676 | 6/2003 |
| WO | WO 03/103921 | 12/2003 |

* cited by examiner

*Primary Examiner*—Harold Joyce
(74) *Attorney, Agent, or Firm*—Dobrusin & Thennisch PC

(57) ABSTRACT

A protection system for a heating, ventilating and air conditioning (HVAC) system including one or more of a base, a shield and a deflector. The protection system is generally designed for preventing water and debris from flowing into the HVAC system.

18 Claims, 7 Drawing Sheets

HVAC PROTECTION SYSTEM FOR AUTOMOTIVE VEHICLES

CLAIM OF BENEFIT OF FILING DATE

The present application claims the benefit of the filing date of U.S. Provisional Application Ser. No. 60/475,463, filed Jun. 3, 2003, hereby incorporated by reference.

FIELD OF THE INVENTION

The present invention relates to a protection system for a heating, ventilating and air conditioning (HVAC) system. More particularly, the present invention relates to a protection system for preventing water, debris or both from entering an air inlet of the HVAC system.

BACKGROUND OF THE INVENTION

Automotive vehicles typically include a cowl adjacent a windshield of the automotive vehicle and the cowl often includes one or more openings for providing ambient air to the HVAC system. Generally, it is undesirable for water or debris to enter the HVAC system through the openings in the cowl. Although industry has taken protective measures to prevent such entry, HVAC systems and particularly HVAC systems having relatively strong blowers still suffer from intake of undesirable amounts of water, debris or both. Therefore the present invention seeks to provide an improved protection system for preventing water and debris from entering automotive HVAC systems.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

Figure 1:
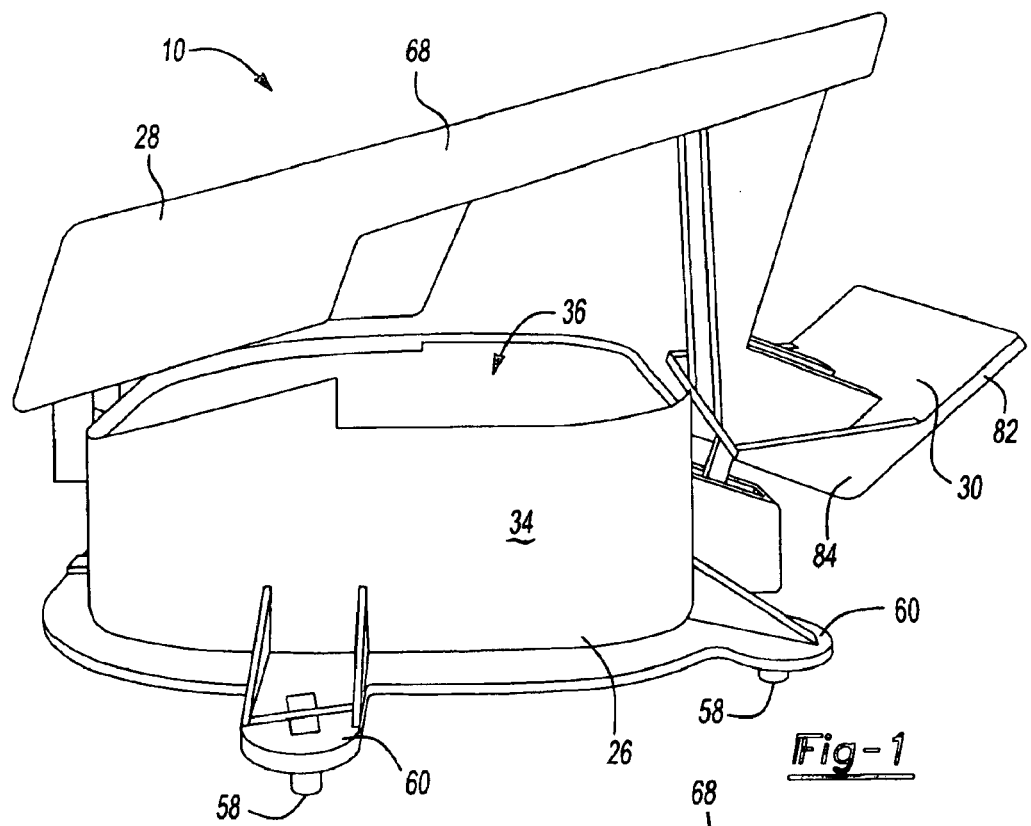
FIG. 1 is a perspective view of a protective structure according to an aspect of the present invention.
Figure 2:
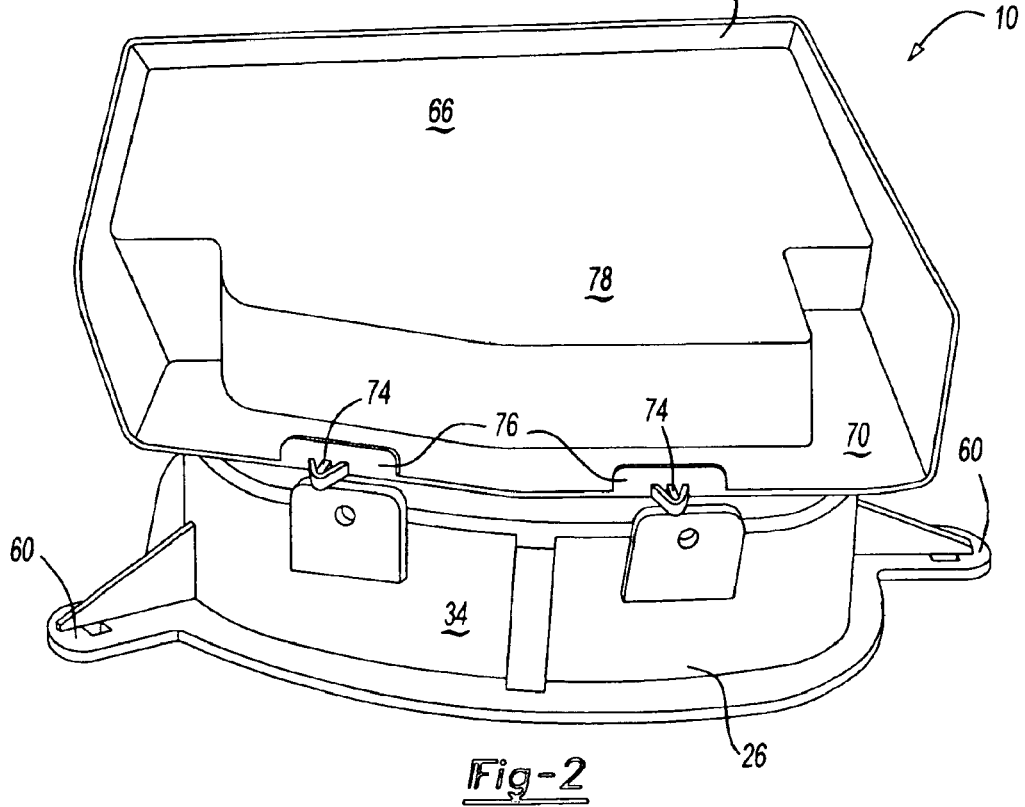
FIG. 2 is another perspective view of the protective structure of FIG. 1.
Figure 3:
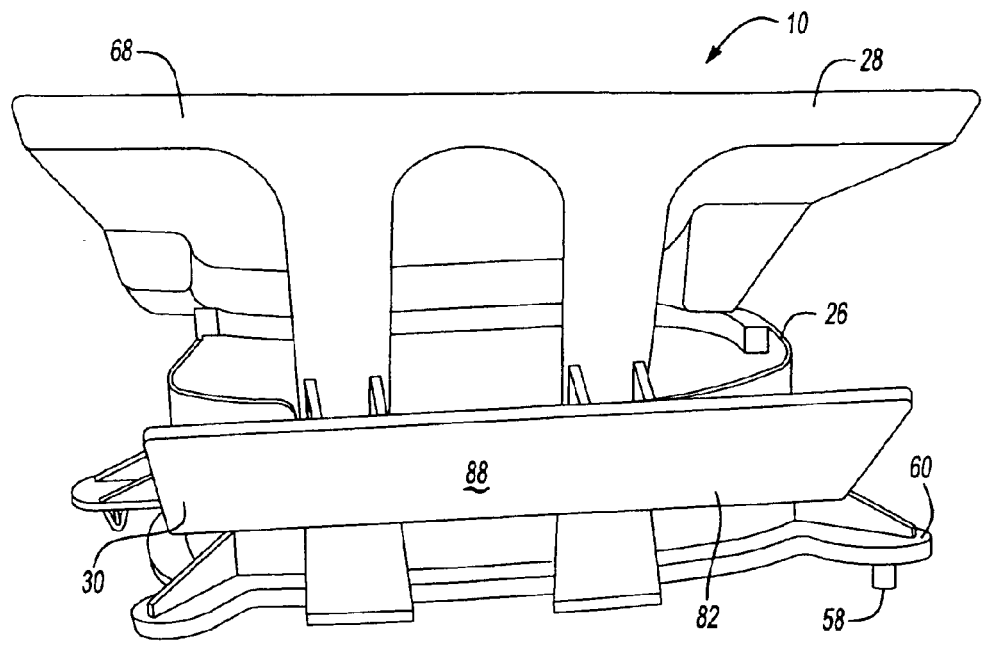
FIG. 3 is another perspective view of the protective structure of FIG. 1.
Figure 4:
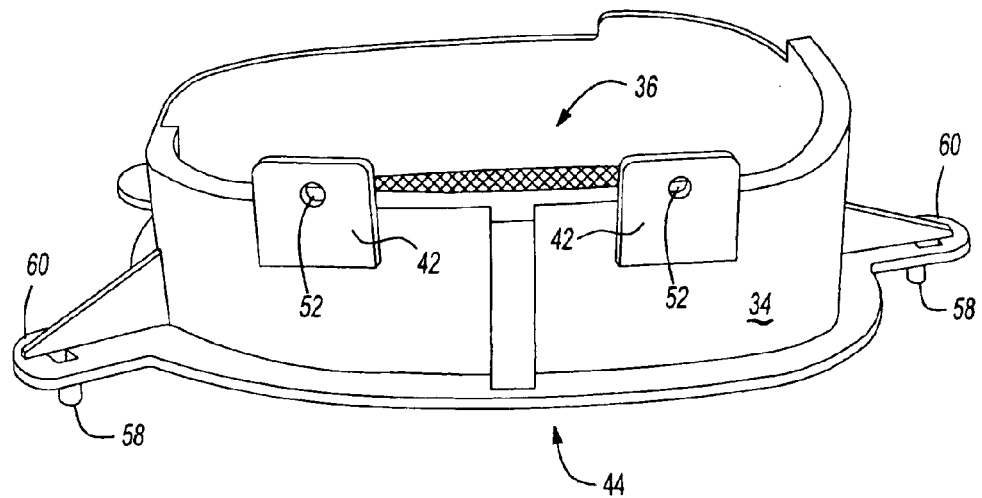
FIG. 4 is a perspective view of a base of the protective structure of FIG. 1.
Figure 5:
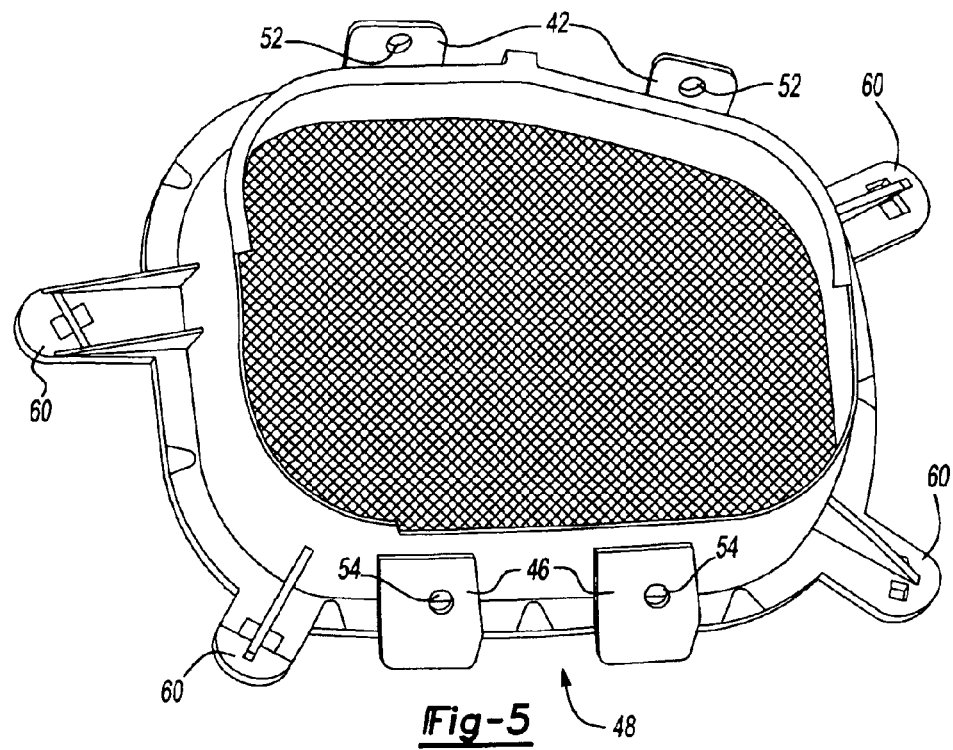
FIG. 5 is another perspective view of the base of FIG. 4.
Figure 6:
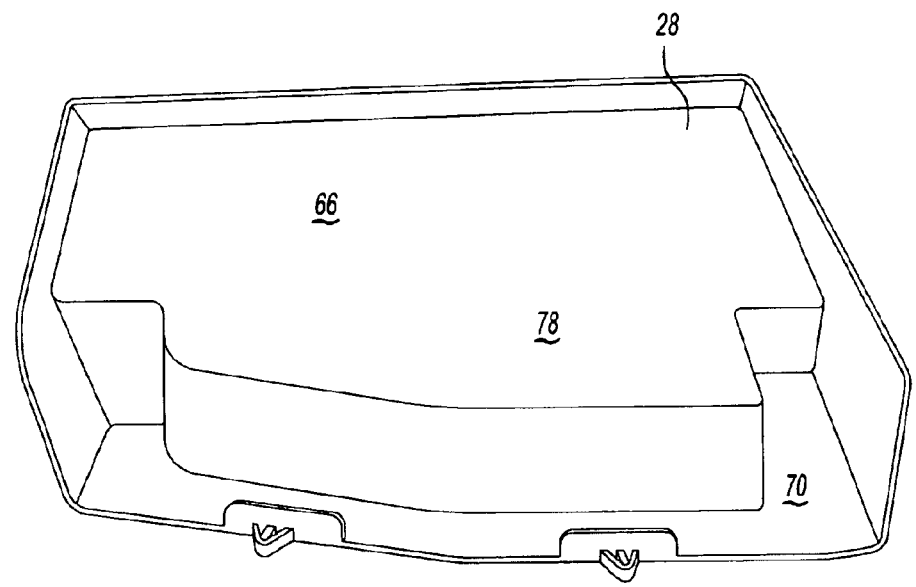
FIG. 6 is a perspective view of a shield and a deflector of the protective structure of FIG. 1.
Figure 7:
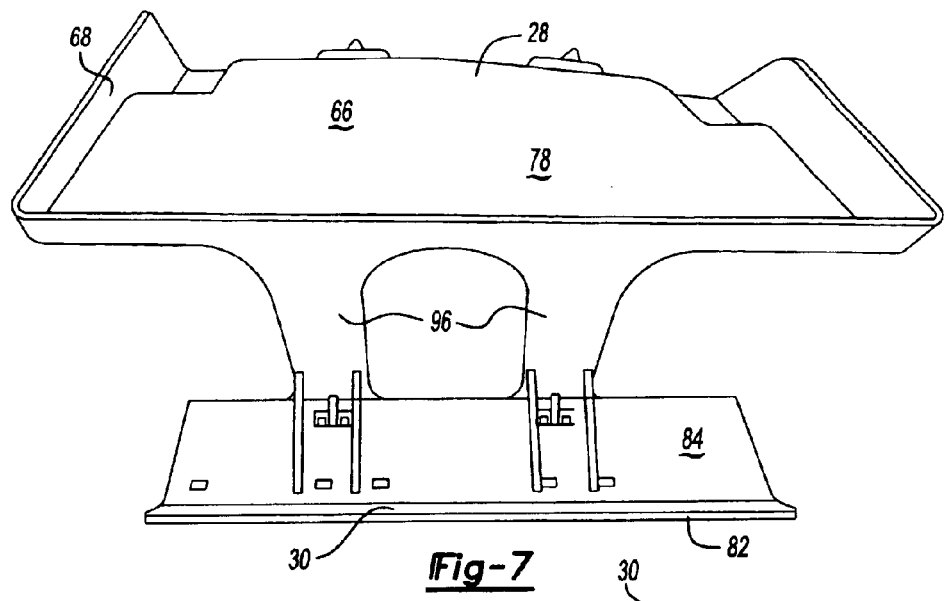
FIG. 7 is another perspective view of the shield and deflector of FIG. 6.
Figure 8:
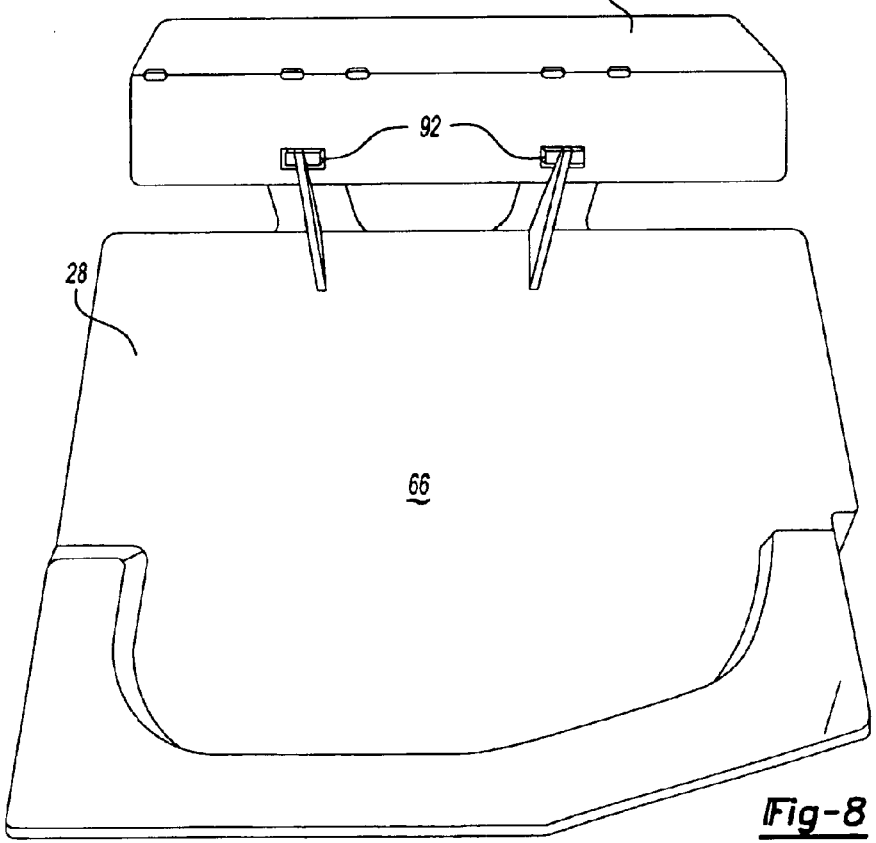
FIG. 8 is another perspective view of the shield and deflector of FIG. 6.
Figure 9:
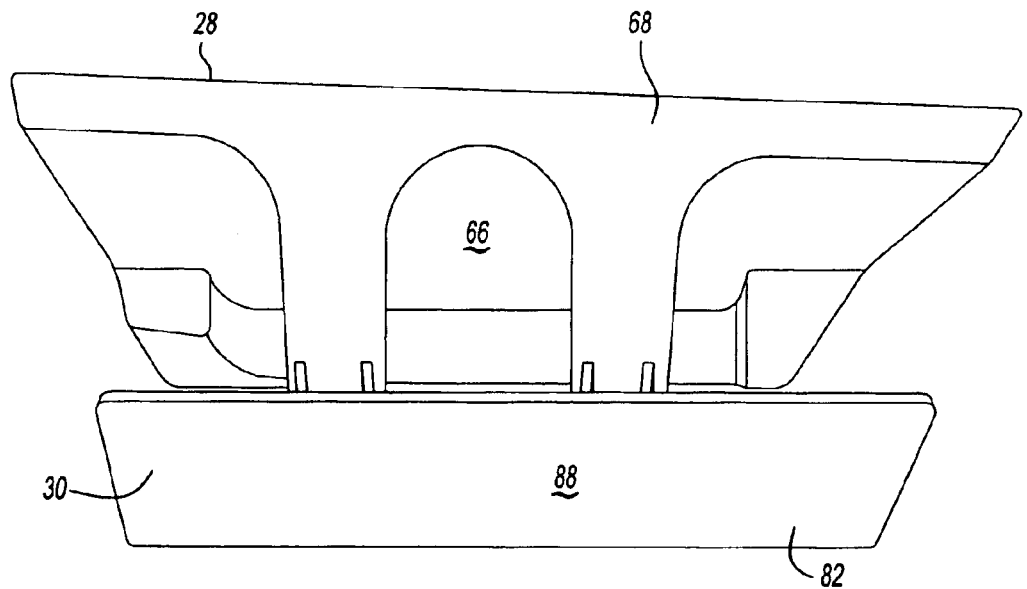
FIG. 9 is another perspective view of the shield and deflector of FIG. 6.

The present invention is predicated upon the provision of a protection system for preventing water and debris from entering a heating, ventilation and air condition (HVAC) system. While the protective system is particularly useful for providing protection to HVAC systems of automotive vehicles, it is contemplated that the protection system may be adapted for use with HVAC systems of other articles of manufacture such as buildings, furniture, watercraft or the like. It is also contemplated that the protection system may be adapted for use with other systems that require removal of liquids from a flowing stream of gas.

Typically, the protection system includes a component of an article of manufacture (e.g., a cowl of an automotive vehicle) and a protective structure associated with the component of the article. The article preferably provides an opening configured for having a fluid (e.g., air) flow therethrough. The protective structure preferably includes one, two or all three of a base, a shield and a deflector for preventing the entry of water, debris or both into the opening of the component.

FIGS. 1–12 illustrate an exemplary protective structure 10, which may be employed for assisting in the prevention of fluid flow into an opening 12 (e.g., a through-hole) of a member of an article of manufacture. In the illustrated embodiment, the member of the article of manufacture is shown as a cowl 14 of an automotive vehicle 16 wherein the cowl 14 is located in an area 18 adjacent to a hood 20 and windshield 22 of the automotive vehicle 16. However, it is contemplated that the member may be another member of an automotive vehicle located in a similar or alternative location. It is also contemplated that the member may be part of a different article of manufacture.

The protective structure 10 includes a base 26, a shield 28 and a deflector 30, but may include fewer or greater components than are illustrated. The base 26 is shown as being generally annular and more particularly as including an annular wall 34 defining an opening 36 (e.g., a through-hole) extending through the base 26. The base 26 also includes a plurality of attachments. In the particular embodiment shown, the attachments of the base 26 include a pair of first protrusions 42 extending from a first side 44 of the base 26 and a pair of second protrusions 46 extending from a second side 48 of the base 26. Both the first protrusions 42 and the second protrusions 46 respectively define openings 52, 54. The attachments of the base 26 also include a plurality of integral or non-integral fasteners 58 (e.g., protrusions) extending from flanges 60 of the base 26. As shown, the flanges 60 extend from a lower portion of the annular wall 34 of the base 26.

The shield 28 includes a panel 66 with a peripheral barrier wall 68 extending about at least a portion of the panel 66. The shield 28 also includes a recess 70. In the particular embodiment illustrated, the shield is generally rectangular and the barrier wall 68 extends upwardly from three sides of the shield 28 and the recess 70 extends along a fourth side of the shield 28. The shield 28 also includes at least one, but preferably a pair of attachments, which are shown as protrusions 74 (e.g., arrowhead protrusions) attached to the shield 28 with flanges 76. Preferably, the shield 28, the panel 66, the barrier wall 68 or a combination thereof define a protective surface 78.

The deflector 30, as shown, includes a first panel 82 and a second panel 84, which are disposed at an angle relative to each other. Preferably, the deflector 30 extends away from the base 26 and provides at least one deflection surface 88, which, in the exemplary embodiment illustrated, is provided as part of the first panel 82. Additionally, the deflector 30 also includes at least one, but preferably a pair of attachments, which are shown as protrusions 92 attached to the deflector 30.

The base 26, the shield 28 and the deflector 30 may be formed of a variety of materials and may be formed of the same or different materials such as metal, ceramics, polymeric material, fibrous materials or the like. Preferably, each of the base 26, the shield 28 and the deflector 30 are formed of a molded polymeric (e.g., plastic) material. When used for automotive vehicles, it is preferable for the materials to be capable of withstanding elevated temperatures (e.g., temperatures greater than 130° C., 150° C., 170° C. or more) without any substantial deformation or degradation. Examples of preferred materials include filled or non-filled thermoplastics such as polypropylenes, polyamides (e.g., nylon), polyethylenes, combinations thereof or the like.

Preferably, the base 26, the shield 28 and the deflector 30 are directly attached to each other, however, it is contemplated that these components may be positioned adjacent to each other and interconnected by attaching the components to one or more members (e.g., the cowl, the hood or the like) of an article of manufacture (e.g., an automotive vehicle). Moreover, it is contemplated that the base 26, the shield 28, the deflector 30 or any combination thereof may be integrally formed with each other, attached to each other with fasteners or otherwise interconnected.

In the illustrated embodiment, the shield 28 and the deflector 30 are integrally formed as a singular molded plastic part. As shown, the shield 28 and deflector 30 are attached to each other with a pair of elongated members 96, which extend from adjacent an edge of the shield 28 to adjacent an edge of the second panel 84 of the deflector 30.

Also, in the exemplary illustrated embodiment, the shield 28 and the deflector 30 are attached to the base 26 with the attachments of these components. As depicted, the protrusions 74 of the shield 28 are received in the openings 52 of the first protrusions 42 and the protrusions 92 of the deflector 30 are received in the openings 54 of the second protrusions 46 of the base 26. Thus, the protrusions 74 of the shield 28 and the protrusions 92 of the deflector 30 are respectively interference fit with the protrusions 42, 46 of the base 26.

While the protective structure 10, the base 26, the shield 28, deflector 30 and the various components thereof have been described in detail, it shall be appreciated that numerous variations may be made to their shapes, geometries and configuration without departing from the scope of the present invention. For example, various portions of the protective structure 10 and its components may be arced, angled, contoured, reshaped, replaced or otherwise reconfigured while remaining within the spirit and scope of the present invention. Moreover, the protective structure 10 and its components may be alternatively formed and interconnected while remaining within the spirit and scope of the present invention.

Figure 10:
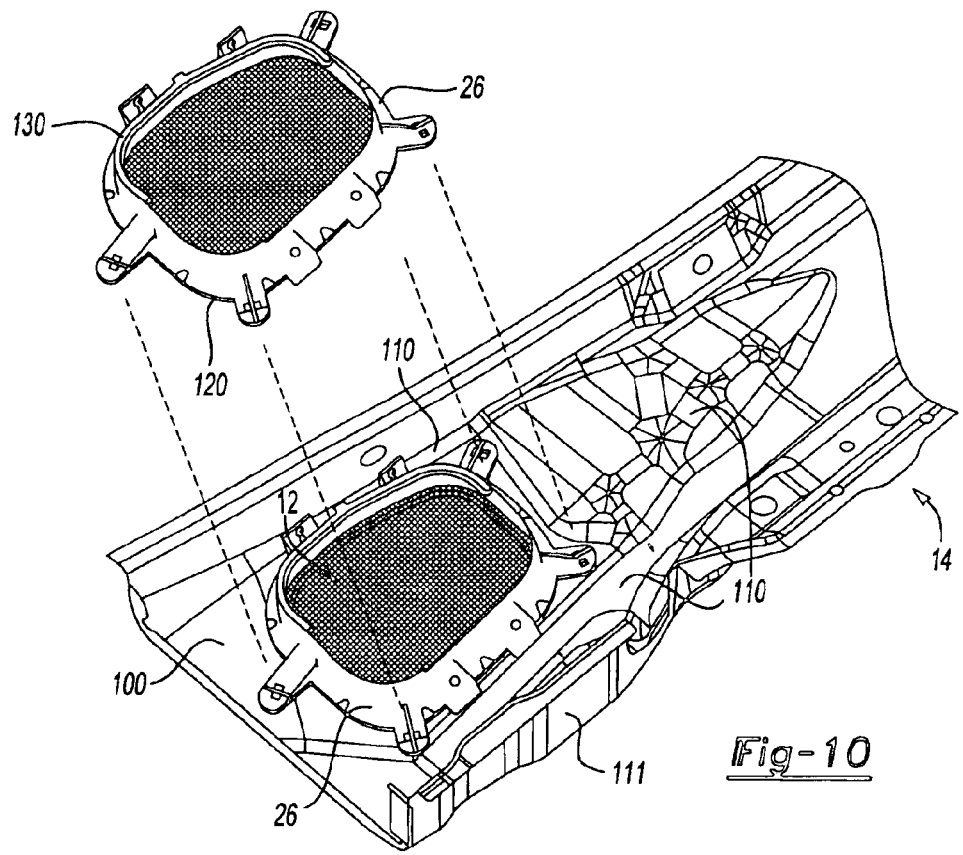
FIG. 10 is a perspective view of the base of the protective structure of FIG. 1 being assembled to a cowl of an automotive vehicle.
Figure 11:
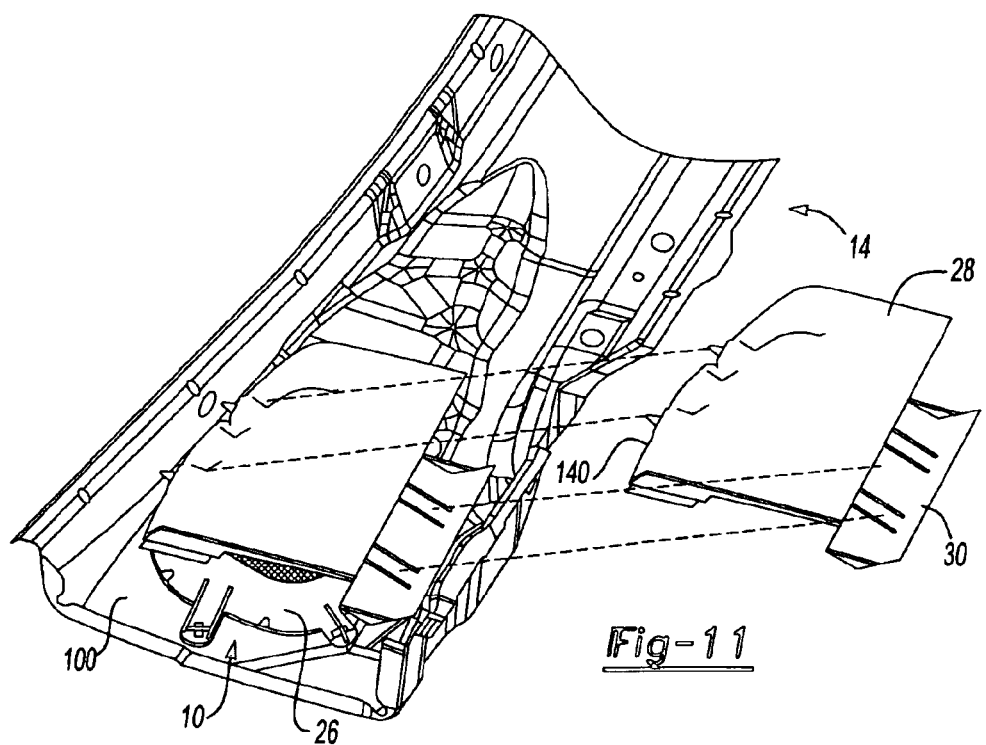
FIG. 11 is a perspective view of the shield and deflector being assembled to the base while attached to the cowl as in FIG. 10.

The opening 12 of the cowl 14, as illustrated in FIGS. 10 and 11, is a through-hole extending through a portion 100 of the cowl 14. The portion 100 preferably includes a raised perimeter portion extending about the opening 12, although not required. A screen preferably spans the opening 12 for assisting in preventing passage of solid materials through the opening 12 although also not required. Such a screen may be formed of metal, nylon or another material and may be integrated with the base, the cowl or both. While described in detail, it shall be recognized that cowls of automotive vehicles can vary and that the present invention may be adapted for use with a cowl or other portion of vehicle or other article of manufacture.

The cowl 14 also provides one or more landings 110 for guiding water around the opening 12, the raised perimeter portion or both. Preferably, the landings 110 extend adjacent the perimeter of the opening 12 although not required.

The protective structure may be assembled and connected to the cowl in a variety of ways and with a variety of fasteners for forming the protection system. The protective structure may be directly attached to the cowl or may be attached using one or more intermediate members. Moreover, the structure might include an intermediate metal member suitable for welding to the cowl. It is also conceivable that part or all of the protective structure might be integrally formed with the cowl.

Figure 12:
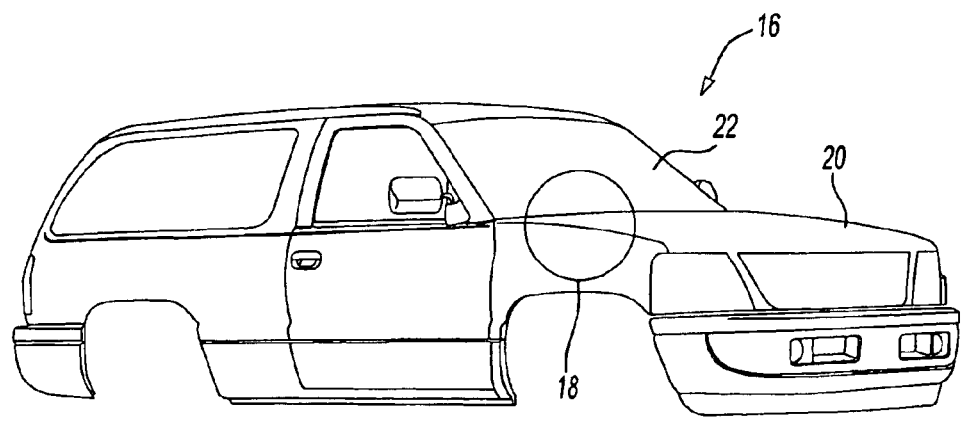
FIG. 12 is a perspective view of an automotive vehicle having the protective structure of FIG. 1.

In the exemplary embodiment and with additional reference to FIGS. 10–12, the base 26 of the structure 10 is attached to the cowl 14 with the attachments of the base 26. In particular, the protrusions 58 of the base 26 are interferingly fit with the cowl 14 by extending the protrusions 58 through openings in the cowl 14. Preferably, a seal 120 seals between the cowl 14 and the base 26 of the structure 10. In the embodiment shown, the seal 120 (e.g., gasket) is heat expandable and coextensive with a lower edge of the base 26 of the structure 10 for sealing between the lower edge and the cowl 14 thereby sealing about the opening 12 of cowl 14.

In FIG. 11, the shield 28 and deflector 30 are assembled to the base 26 as described above after the base 26 has been assembled to the cowl 14. However, it is contemplated that any order of assembly between the base 26, the cowl 14, the shield 28 and the deflector 30 may be employed within the scope of the present invention.

Advantageously, for embodiments where the base 26 is assembled to the vehicle prior to assembling the shield 28 and/or the deflector 30 to the base 26, it is contemplated that one or more processing operations may be performed upon the vehicle between assembly of the base 26 to the vehicle and assembly of the shield 28 and/or deflector 30 to the base 26. As an example, one or more welding operations may be performed on vehicle components such as the cowl, the hood, the dash, combinations thereof or the like in between assembly of the base 26 and assembly of the shield, 28, and/or the deflector 30 to the vehicle.

In a preferred embodiment, a seal 130 is positioned between the shield 28 and the base 26. In the embodiment shown, the seal 130 is located between an upper edge of the base 26 and the shield 28 for sealing between the upper edge and the shield 28.

Upon assembly of the protective structure 10 to the cowl 14, an opening of the protective structure 10 preferably aligns with the opening 12 in the cowl 14. In the illustrated embodiment, the opening 36 of the base 26 aligns with the opening 12 of the cowl 14 such that air may flow successively through the openings 36, 12. The panel 66, the protective surface 78 or both of the shield 28 are preferably in substantially spaced apart opposing relation to the opening 12 of the cowl 14 such that the surface 28 overlays and/or covers at least a portion and, preferably, substantially all of the opening 12 of the cowl 14. Also upon assembly, the first panel 82, the deflection surface 88 or both of the deflector 30 are preferably interposed between at least one of the landings 110 and the opening 12 of the cowl 14, the opening 36 of the base 26 or both.

The seals 120, 130 may be formed from a variety of suitable materials. Preferably, the seals 120, 130 are formed of a heat activated material having foamable characteristics. The material may be generally dry to the touch or tacky and be shaped in any form of desired pattern, placement, or thickness, but is preferably of substantially uniform thickness. One exemplary expandable material is L-7102 foam available through L&L Products, Inc. of Romeo, Mich.

Though other heat-activated materials are possible for the seals 120, 130, a preferred heat activated material is an expandable polymer or plastic, and preferably one that is foamable. A particularly preferred material is an epoxy-based foam, which may be structural, sealing or both. For example, and without limitation, the foam may be an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of epoxy-based structural reinforcing or sealing foams are known in the art and may also be used to produce the foam. A typical foam includes a polymeric base material, such as an epoxy resin or ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally-activated material, the structural foam is usually initially processed as a flowable thermoplastic material before curing. It will cross-link upon curing, which makes the material incapable of further flow.

An example of a preferred foam formulation is an epoxy-based material that is commercially available from L&L Products of Romeo, Mich., under the designations L5206, L5207, L5208, L5209. One advantage of the preferred structural foam materials over prior art materials is that the preferred materials can be processed in several ways. The preferred materials can be processed by injection molding, extrusion compression molding or with a mini-applicator. This enables the formation and creation of part designs that exceed the capability of most prior art materials.

While the preferred materials for fabricating the seals have been disclosed, the seals can be formed of other materials provided that the material selected is heat-activated or otherwise activated by an ambient condition (e.g. moisture, pressure, time, chemical reaction or the like) and cures in a predictable and reliable manner under appropriate conditions for the selected application. Of course, the seals may also be formed of non-activatable materials.

One example of a material is the epoxy based resin disclosed in U.S. Pat. No. 6,131,897, the teachings of which are incorporated herein by reference, filed with the United States Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766,719; 5,755,486; 5,575,526; and 5,932,680, (incorporated by reference). In general, the desired characteristics of the seals include high glass transition temperature (typically greater than 70 degrees Celsius), and adhesion durability properties. In this manner, the material does not generally interfere with the materials systems employed by automobile manufacturers.

In applications where the seals are heat activated, thermally expanding material, an important consideration involved with the selection and formulation of the material comprising the structural foam is the temperature at which a material reaction or expansion, and possibly curing, will take place. Typically, the foam becomes reactive at higher processing temperatures, such as those encountered in an automobile assembly plant, when the foam is processed along with the automobile components at elevated temperatures or at higher applied energy levels, e.g., during paint curing steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, blowing agent activators can be incorporated into the composition to cause expansion at different temperatures outside the above ranges. Generally, suitable expandable foams have a range of expansion ranging from approximately 0 to over 1000 percent.

Some other possible materials for the seals include, but are not limited to, polyolefin materials, copolymers and terpolymers with at least one monomer type an alpha-olefin, phenol/formaldehyde materials, phenoxy materials, and polyurethane. See also, U.S. Pat. Nos. 5,266,133; 5,766,719; 5,755,486; 5,575,526; 5,932,680; and WO 00/27920 (PCT/US 99/24795) (all of which are expressly incorporated by reference). In general, the resulting material preferably includes good adhesion durability properties.

In another embodiment, the seals are provided in an encapsulated or partially encapsulated form, which may comprise a pellet, which includes an expandable foamable material, encapsulated or partially encapsulated in an adhesive shell. An example of one such system is disclosed in commonly owned, co-pending U.S. application Ser. No. 09/524,298 ("Expandable Pre-Formed Plug"), hereby incorporated by reference.

It is contemplated that the material of the seals could be delivered and placed into contact with the assembly members, through a variety of delivery systems which include, but are not limited to, a mechanical snap fit assembly, extrusion techniques commonly known in the art as well as a mini-applicator technique as in accordance with the teachings of commonly owned U.S. Pat. No. 5,358,397 ("Apparatus For Extruding Flowable Materials"), hereby expressly incorporated by reference. In this non-limiting embodiment, the material or medium is at least partially coated with an active polymer having damping characteristics or other heat activated polymer, (e.g., a formable hot melt adhesive based polymer or an expandable structural foam, examples of which include olefinic polymers, vinyl polymers, thermoplastic rubber-containing polymers, epoxies, urethanes or the like) wherein the foamable or expandable material can be snap-fit onto the chosen surface or substrate; placed into beads or pellets for placement along the chosen substrate or member by means of extrusion; placed along the substrate through the use of baffle technology; a die-cast application according to teachings that are well known in the art; pumpable application systems which could include the use of a baffle and bladder system; and sprayable applications.

In operation, the protective structure 10 assists in preventing water from rain or other sources and debris from passing through the opening 12 of the cowl 14, the opening 12 of the base 26 or both. Typically, water that enters the area surrounding the opening 12 of the cowl 14 typically lands upon the surface 78 of the shield 28 or on the cowl 14 around its opening 12. Advantageously, the protective structure 10 is capable of substantially preventing water from entering the opening 12 of the cowl 14 regardless of whether the water lands on the shield 28 or the cowl 14.

As an initial matter, the wall 34 of the base 26 and the seal 120 between base 26 and the cowl 14 provides a protective barrier that generally prevents water from entering the opening 12 of the cowl 14. Additionally, however, the shield 28 and the deflector 30 also prevent water from entering the opening 12 of the cowl 14.

As shown, the protective surface 78 of the shield 28, the panel 66 of the shield 28 or both are disposed at a skew angle relative to horizontal upon assembly of the protective structure 10 to the cowl 14. Advantageously, as a result of the angled surface 78 and the barrier wall 68, water that lands upon the surface 78 of the shield 28 flows down that surface 78 and off an edge 140 of the shield 28 adjacent the recess 70. As illustrated, the edge 140 is located sufficiently far away from the opening 36 of the base 26 and the opening 12 of the cowl 14 such that the water is prevented from flowing into those openings 36, 12.

As for the water that lands on the cowl 14, that water typically flows along the one or more landings 110 of the cowl 14 and away from the opening 12 of the cowl 14 (e.g., through one or more drain-holes 111 or otherwise). It has been found, however, that the HVAC system (i.e., the pumps or blowers of the system) can pull air through the opening 12 of the cowl 14 at sufficient rates to create an updraft over one or more of the landings 110 of the cowl 14 or through the one or more drain-holes 111. It has further been found that the updraft can lift water from the landings 110 or drain-hole 111 and into the opening 12 of the cowl 14. Advantageously, the deflector panel 82, the deflector surface 88 or both interfere with the formation of the updraft and can deflect any rising water away from the opening 12 of the cowl 14. In this manner, the deflector 30 additionally helps the protective structure 10 in preventing water from entering the opening 12 of the cowl 14.

As an added advantage, it has been found that the protective structure 10 can protect the opening 12 of the cowl 14 from water entry under extreme conditions (e.g., when the vehicle is tipped at an angle relative to its normal horizontal positioning), although not required by the invention. For instance, when the vehicle 16 is going uphill during rain conditions, a large sum of water can accumulate adjacent the side of the base 26 closest the windshield 22. Advantageously, the seal 130 in conjunction with the shield 28 and the base 26, however, can assist in protecting the opening 12 of the cowl 14 from intake of such water.

In addition to the components or portion discussed above, it is contemplated that the structure 10 may be formed with additional components or portions that are not shown. For example, the base, the shield or the deflector may include members such as flanges that may extend upward, downward or horizontal from surfaces that are vertical, horizontal or a combination thereof for assisting in deflection of water. As another example, the structure 10 may include or be associated with a filter or filter system. Moreover, it is contemplated that the seals of the invention may include a ribbon for assisting in providing sealing properties.

Figure 13:
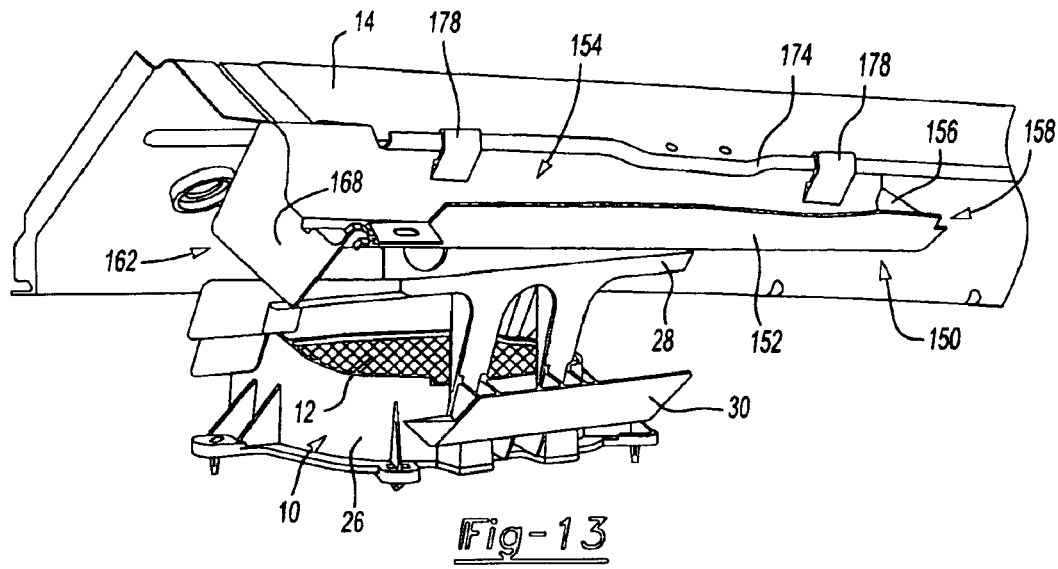
FIGS. 13 and 14 are perspective view of an embodiment of the protection system having an additional shield.
Figure 14:
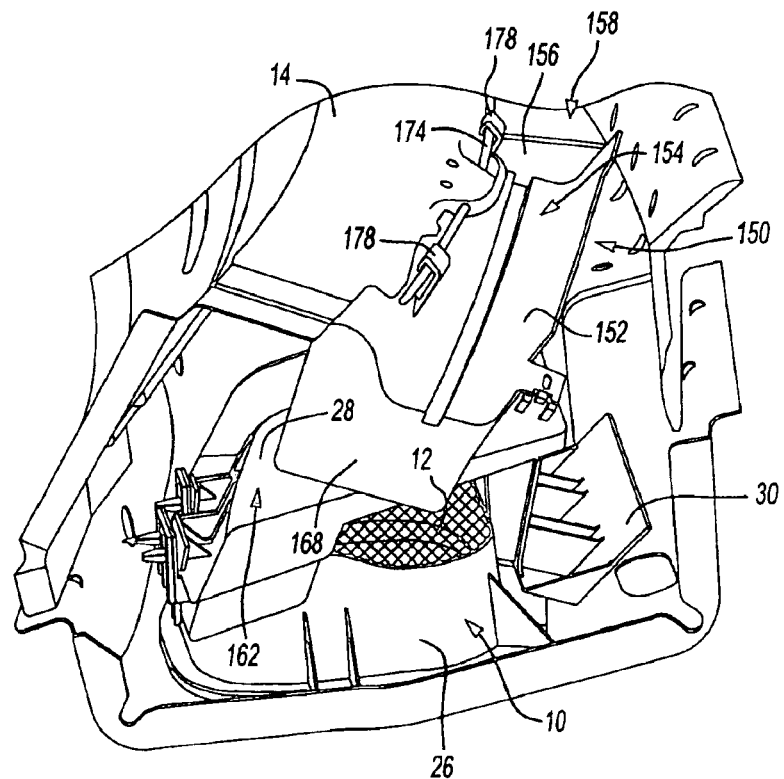

In one embodiment, and referring to FIGS. 13 and 14, the protection system of the present invention may include a second, additional or alternative shield 150. It is contemplated that the shield 150 may be formed in a variety of shapes and configurations. As can be seen, the shield 150 is generally elongated and has a wall 152 with a generally U-shaped cross-section substantially perpendicular to the length of the wall 152, the shield 150 or both for forming a channel 154 along the length.

A wall 156 at a first end 158 of the shield 150 blocks passage of fluid (e.g., water) out of that end 158 of the shield 150, channel 154 or both. At a second end 162 of the shield 150, opposite the first end 158, the channel 154 is unblocked for allowing passage of fluid (e.g., water) out of the shield 150, the channel 154 or both. The shield 150 also includes a deflector 168 that extends outwardly and downwardly relative to the end 158, the channel 154 or both.

The shield 150 may be attached to the cowl 14, the structure 10 or any of the components of the structure 10 and may be attached with adhesives, fasteners or other attachment. In the embodiment shown, the shield 150 is attached to an edge 174 of the cowl 14 with interference type fasteners 178. Moreover, the shield 150 is attached to the cowl 14 such that the shield 150 overlays and opposes (e.g., is located vertically above) at least a portion and typically a substantial portion of the structure 10, the opening 12 or both.

In operation, fluid and particularly water, flows from the cowl 14 or other areas into the channel 154. The fluid then flows out of the channel 154 at the second end 162 of the shield 150. Advantageously, the shield 150 generally assists in moving fluid away from the opening 12 and, as an additional advantage, the deflector 168 also assists in preventing fluid from entering the opening 12 as it flow out of the channel 154.

While the shield 150 has been illustrated as being employed in conjunction with the entire structure 10, it is contemplated that the shield 150 may be employed with any lesser combination of the base 26, shield 28 and deflector 30 of the structure 10 and may be employed alone or entirely without the structure 10.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A protection system for an opening of an automotive vehicle, comprising:
   a component of an automotive vehicle, the component including an opening for providing fluid flow therethrough;
   a protective structure including a base and a shield wherein;
   i) the base is annular for forming a protective wall about the opening;
   ii) the shield includes a panel, which overlays at least a portion of the opening of the component and the panel extends in directions skew to horizontal; and
   iii) the shield includes a peripheral barrier wall and the barrier wall extends upwardly from sides of the shield.

2. A protection system as in claim 1 wherein the barrier wall extends upwardly from three sides of the shield.

3. A protection system as in claim 1 wherein the shield includes a recess extending along a side thereof.

4. A protection system as in claim 1 wherein the base, the shield or both include attachments for attaching the base and the shield together.

5. A protection system as in claim 4 wherein the attachments include a protrusion.

6. A protection system as in claim 1 further comprising a seal located between the base and the shield.

7. A protection system as in claim 6 wherein the seal is formed of an activatable foamable material.

8. A protection system for preventing water from entering an HVAC system of an automotive vehicle, comprising:
   a cowl located at least partially below a hood of the automotive vehicle, the cowl including an opening for providing fluid communication with an HVAC system;
   a protective structure including a base and a shield wherein:
   i) the base is annular for forming a protective wall about the opening of the cowl and the base has an opening at least partially aligned with the opening of the cowl;
   ii) the shield includes a panel; which overlays substantially all of the opening of the cowl and the panel extends in directions skew to horizontal; and
   iii) the shield includes a peripheral barrier wall and the barrier wall extends upwardly from sides of the shield.

9. A protection system as in claim 8 wherein the barrier wall extends upwardly from three sides of the shield.

10. A protection system as in claim 8 wherein the shield includes a recess extending along a side of the shield.

11. A protection system as in claim 8 further comprising a seal located between the base and the shield.

12. A protection system as in claim 11 wherein the seal is formed of an activatable foamable material.

13. A protection system for preventing water from entering an HVAC system of an automotive vehicle, comprising:
   a cowl located at least partially below a hood of the automotive vehicle, the cowl including an opening for providing fluid communication with an HVAC system, the cowl also including at least one landing extending adjacent the opening wherein the landing guides water away from the opening;
   a protective structure including a base, a shield and a deflector wherein:
   i) the base is annular for forming a protective wall about the opening of the cowl and the base has an opening at least partially aligned with the opening of the cowl;
   ii) the shield includes a panel, which overlays substantially all of the opening of the cowl and the panel extends in directions skew to horizontal;
   iii) the deflector includes a panel that extends away from the base at least partially over the landing of the cowl and the panel of the deflector extends in directions skew to horizontal; and
   iv) the shield includes a peripheral barrier wall and the barrier wall extends upwardly from sides of the shield.

14. A protection system as in claim 13 wherein the peripheral barrier wall to extends upwardly from three sides of the shield and a recess extends along a side of the shield.

15. A protection system as in claim 13 further comprising a seal located between the base and the shield and a seal located between the base and the cowl wherein each seal is formed of an activatable foamable material.

16. A protection system as in claim 15 wherein the shield and the deflector are integrally formed as a singular molded plastic part.

17. A protection system as in claim 16 wherein the shield is attached to the deflector with an elongated member.

18. A protection system as in claim 17 further comprising a screen disposed over the opening of the cowl.

\* \* \* \* \*